United States Patent Office 3,540,798
Patented Nov. 17, 1970

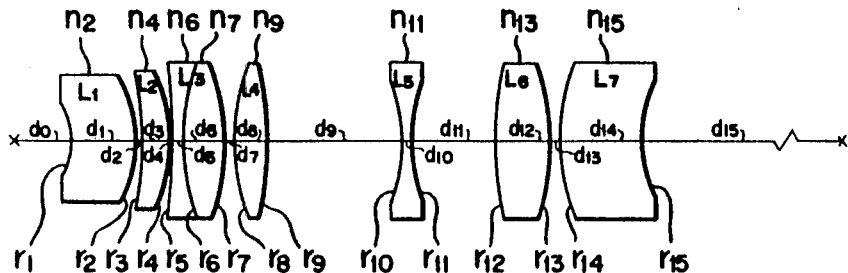
FIG. 1
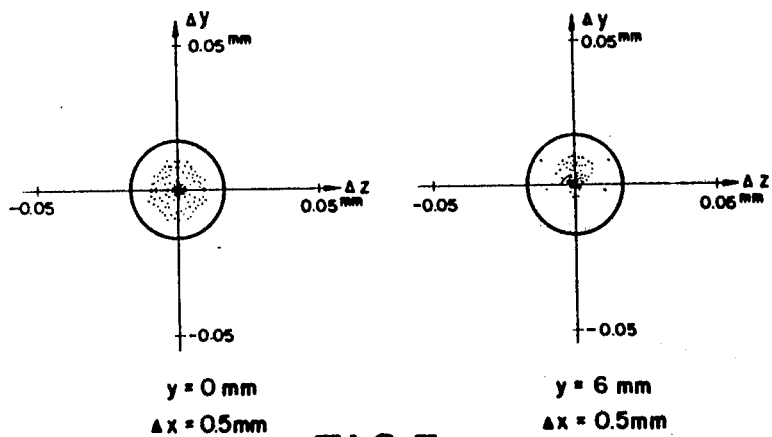
FIG. 3a  
y = 0 mm  
Δx = 0.5 mm
FIG. 3b  
y = 6 mm  
Δx = 0.5 mm
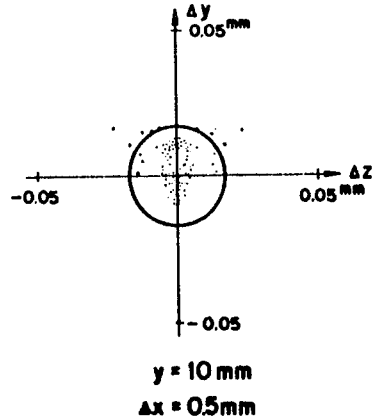
FIG. 3c  
y = 10 mm  
Δx = 0.5 mm

3,540,798
TRIPLET TYPE SYSTEM IN OBJECTIVE LENS FOR MICROSCOPE
Hidekazu Kobaya, Tokyo, Japan, assignor to Nippon Kogaku K.K., Tokyo, Japan, a corporation of Japan
Filed Apr. 24, 1968, Ser. No. 723,719
Claims priority, application Japan, May 30, 1967, 42/33,927
Int. Cl. G02b 9/64, 11/34
U.S. Cl. 350—177
2 Claims

ABSTRACT OF THE DISCLOSURE

An objective lens is provided for a microscope having excellent resolution, an extended working distance, and a flattened image surface. A triplet type optical system of positive, negative, positive lens groups is provided in a conventional lens system having a thick meniscus in the front and rear portions, the system being almost symmetrical with respect to the negative lens group.

---

This invention relates to an objective lens for microscope which comprises providing a triplet type optical system composed of three groups of positive, negative and positive lenses in the conventional lens system containing thick meniscus lenses in the fore and rear portions of the lens system.

There has been a strong demand to flatten the image surface of the objective lens of a microscope, and in order to flatten the image surface of the objective lens, there has been proposed such a method that a meniscus lens whose central thickness is remarkably great is provided in the lens system and Petzval's sum is reduced to obtain the flat image surface.

However, in the lens system where this meniscus lens is used the curvature of field can be corrected, but as the compensation thereof, the chromatic aberration, particularly the spherical aberration caused by color becomes greater, and considerable bad effect is brought about to coma, in most cases.

The object of this invention is to eliminate the load of a thick meniscus lens before and behind the lens system by providing a triplet type optical system composed of three groups of positive, negative and positive lenses in the conventional lens system containing a thick meniscus lens in the fore and rear portions of the lens system to prevent the deterioration of the image caused by the thick meniscus lens as much as possible, and to produce such objective lens that the working distance is great, and the produced image surface is flattened, and excellent resolution can be presented not only in the center of the field, but in the peripheral portion, and the respective aberrations are excellently corrected.

In accordance with this invention, as shown in the diagrams of aberration and spot diagrams of an embodiment, it is possible to obtain the objective lens for microscope of long working distance wherein the image surface is sufficiently flattened, and the resolution is excellently compensated within a whole field of view.

In accordance with this invention, as described hereinafter, an objective lens for microscope which comprises providing meniscus lenses $L_1$ and $L_7$ in the fore and rear portions of the lens system, wherein the lens system has the triplet type lenses $L_4$, $L_5$ and $L_6$ composed of three groups of the positive, negative and positive lenses between $L_3$ and $L_7$, and the positive lenses $L_2$ and $L_3$ follow $L_1$; at least one of $L_1$, $L_2$, and $L_3$ is a cemented lens; and the conditions described thereinafter are satisfied.

This invention will be described more clearly referring to the illustrative embodiments shown in the attached drawing, in which:

FIG. 1 is a cross sectional view of the objective lens of this invention;

FIG. 3 is spot diagrams of the same embodiment.

Figure 2A:
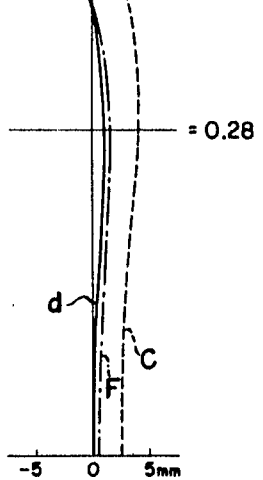
FIG. 2 is diagrams showing the aberration of the embodiment and (a) shows the spherical aberration and chromatic aberration, and (b) shows the astigmatism, and (c) shows the distortion, and (d) shows the coma.

Referring first to FIG. 1, there is shown a cross sectional view of the lens system of this invention, and in the diagram $L_1$ is the positive meniscus lens whose concave surface is directed to the object; $L_2$, $L_3$ are respectively the positive lenses, and among these lenses $L_1$ through $L_3$, at least one of them is a cemented lens; $L_4$ and $L_6$ are the positive lenses; $L_5$ is a biconcave negative lens, and the axial intervals between $L_4$, $L_5$, and $L_5$, $L_6$ are quite long when compared with the central thickness of the lens $L_5$.

Last of all, there is a negative meniscus lens $L_7$ whose concave side is directed towards the image. In such a lens system as above, this invention is characterized in that the following conditions are satisfied.

(1)    $0.63f < -r_1 < 0.69f$
(2)    $0.78f < -r_2 < 0.86f$
(3)    $1.96f < r_8 < 2.00f$
(4)    $1.35f < -r_{10} < 1.38f$
(5)    $1.42f < r_{11} < 1.57f$
(6)    $3.60f < r_{12} < 3.78f$
(7)    $1.86f < -r_{13} < 2.07f$
(8)    $1.56f < r_{14} < 1.58f$
(9)    $0.91f < r_{15} < 1.00f$
(10)   $0.49f < d_1 < 0.55f$
(11)   $0.20f < d_3 < 0.27f$
(12)   $0.94f < d_9 < 1.14f$
(13)   $0.59f < d_{11} < 0.72f$
(14)   $0.57f < d_{14} < 0.70f$ (wherein $f$ stands for the focal length of the whole system).

The significances of the above given conditions are explained in the following paragraphs.

The spherical aberration affecting the resolution, can be corrected by (1), (3), (4), (6), (8), (12), and (13), and the spherical aberration caused by color can be controlled by (3), (8), (10) and (11) in such a degree that can be practically used.

Next, among the aberrations affecting the periphery of the field, coma can be corrected by the conditions from (5) to (9), and the conditions (13) and (14), and astigmatism can be corrected by the conditions (2), (3), (8), and (14).

Namely, as mentioned above, by using triplet type optical system composed of $L_4$, $L_5$, and $L_6$ in the lens system, the light flux having passed through $L_4$ is converged and passes through the neighbourhood of the center of $L_5$, and then it is dispersed and enters into $L_6$. Therefore it is possible to use a surface of relatively large curvature for $L_5$ to reduce Petzval's sum, and at the same time to ease the load of the thick meniscus lenses $L_1$ and $L_7$.

Therefore, it is possible to use the surfaces of relatively small curvature for $L_1$ and $L_7$, and at the same time the deterioration of aberration caused by the thick meniscus lenses, is remarkably little since it is not necessary to remarkably increase the central thickness.

On the other hand, when the lens system is observed as a whole, the lens system is almost symmetrical with $L_5$ as the center, to prevent the generation of aberration caused by the non-symmetricality, and on the other hand, it is possible to carry out the balanced compensation of the respective aberrations and in the lens system of such a structure, and significance for providing such conditions is as follows.

The aberration caused by $r_1$ can be compensated by the aberration caused by $r_{11}$, but when the compensation is desired to be carried out beyond that range, the coma caused by $r_{11}$ cannot be corrected. The aberration caused by $r_2$ can be almost compensated by $d_1$ and $r_{15}$, but when it goes beyond said range, the chromatic aberration of the spherical aberration cannot be compensated by $d_1$, and astigmatism cannot be compsenated by $r_{15}$, but these aberrations are remained; $r_8$ and $r_{10}$ can almost compensate with each other, but when it goes beyond said range, the astigmatism caused by $r_8$ cannot be compensated any more; $r_{12}$ and $r_{14}$ can almost compensate with each other, but when it goes beyond said range, the chromatic aberration of the spherical aberration and astigmatism caused by $r_{14}$ are remained.

The aberration caused by $r_{13}$ can be compensated by $d_5$ and $d_{14}$, but when it goes beyond said range, the chromatic aberration of the spherical aberration caused by $d_3$ and coma and astigmatism caused by $d_{14}$ become remarkable; $d_9$ and $d_{11}$ can compensate with each other, but when it goes beyond said range, coma cannot be compensated by $d_{11}$.

TABLE 1

[N.A.=0.4; Magnification=20X; F=7.69 mm.]

| r | d | nd | vd |
|---|---|---|---|
| | $d_0=3.4025$ | $n_1=1.0$ | |
| $r_1=-5.06$ | $d_1=4.0$ | $n_2=1.78797$ | $v_2=47.5$ |
| $r_2=-6.3$ | $d_2=0.2$ | $n_3=1.0$ | |
| $r_3=-25.8$ | $d_3=1.8$ | $n_4=1.51680$ | $v_4=64.2$ |
| $r_4=-9.63$ | $d_4=0.1$ | $n_5=1.0$ | |
| $r_5=-43.2$ | $d_5=0.7$ | $n_6=1.74000$ | $v_6=28.2$ |
| $r_6=18.35$ | $d_6=2.4$ | $n_7=1.48669$ | $v_7=81.7$ |
| $r_7=-11.5$ | $d_7=0.6$ | $n_8=1.0$ | |
| $r_8=15.26$ | $d_8=1.8$ | $n_9=1.62041$ | $v_9=60.3$ |
| $r_9=-24.7$ | $d_9=8.0$ | $n_{10}=1.0$ | |
| $r_{10}=-10.5$ | $d_{10}=0.6$ | $n_{11}=1.74077$ | $v_{11}=27.7$ |
| $r_{11}=11.5$ | $d_{11}=5.0$ | $n_{12}=1.0$ | |
| $r_{12}=28.35$ | $d_{12}=3.2$ | $n_{13}=1.73350$ | $v_{13}=51.0$ |
| $r_{13}=-15.1$ | $d_{13}=0.5$ | $n_{14}=1.0$ | |
| $r_{14}=12.08$ | $d_{14}=4.9$ | $n_{15}=1.63930$ | $v_{15}=45.0$ |
| $r_{15}=7.35$ | $d_{15}=146.1001$ | $n_{16}=1.0$ | |

Table 1 shows an embodiment of the objective lens ($N.A.=0.4$, the magnification=20), and $r$, $d$, $nd$, and $vd$ respectively show the radius of curvature, the central thickness or air space, and refractive index of the glass for line $d$, and Abbe's number.

Figure 2B:
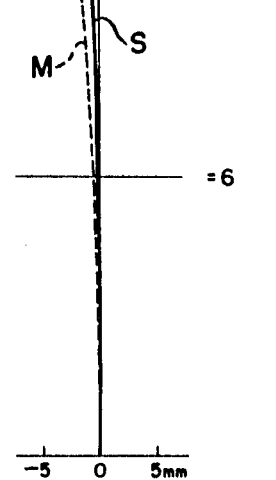
Figure 2C:
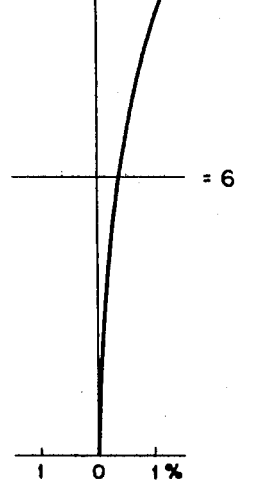
Figure 2D:
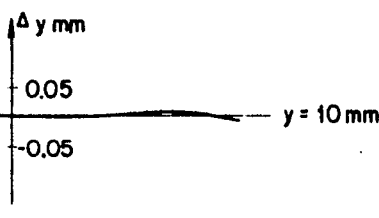
Figure 2D:
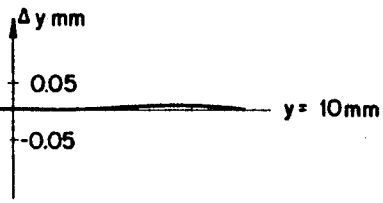

In FIG. 2, (a) shows the spherical aberration and chromatic aberration, and (b) shows the astigmatism, and (c) shows distortion, and (d) shows the coma. FIG. 3 is a spot diagram for line $d$ in the respective image points on the axis (a) and those on (b) 6 mm. from the axis, and (c) 10 mm. from the axis. (In the spot diagram $\Delta x$ shows the deviation from the Gauss image surface on the light axis, and the circle shows the airy disk).

On the other hand, Seidel aberration coefficient on the surface of an object when the focal length is set to be 1 mm. and the image point is to be $\infty$ is as follows.

$\Sigma\ \mathrm{I}i=-0.0640$
$\Sigma\ \mathrm{II}i=0.0139$
$\Sigma\ \mathrm{III}i=-1.0434$
$\Sigma\ \mathrm{IV}i=-0.3300$
$\Sigma\ \mathrm{V}i=4.8028$

What is claimed is:

1. An optical system for a microscope objective having flattened image field comprising
   a triplet type group including two convergent biconvex lenses axially separated, and a divergent biconcave lens disposed between said two biconvex lenses and spaced from each of them by air,
   a front convergent meniscus group in front of said triplet type group, composed of first, second and third meniscus lenses which are all concave toward the object side of system, the third meniscus lens being compound, and
   a rear meniscus group separated from said front meniscus group by said triplet type group and composed of a thick meniscus lens being concave toward the image side of said system, the system being almost symmetrical with respect to the biconcave lens, and in which the following conditions are satisfied:

(1) $0.63f<-r_1<0.69f$
   (2) $0.78f<-r_2<0.86f$
   (3) $1.96f<r_8<2.00f$
   (4) $1.35f<-r_{10}<1.38f$
   (5) $1.42f<r_{11}<1.57f$
   (6) $3.60f<r_{12}<3.78f$
   (7) $1.86f<-r_{13}<2.07f$
   (8) $1.56f<r_{14}<1.58f$
   (9) $0.91f<r_{15}<1.00f$
   (10) $0.49f<d_1<0.55f$
   (11) $0.20f<d_3<0.27f$
   (12) $0.94f<d_9<1.14f$
   (13) $0.59f<d_{11}<0.72f$
   (14) $0.57f<d_{14}<0.70f$ wherein $f$ is the focal length of the whole optical system, and $r$ is the radius of curvature, and $d$ is the central thickness of a lens or air space.

2. An optical system according to claim 1, wherein the parameters of the lenses are as follows

[N.A.=0.4; Magnification=20X; F=7.69 mm.]

| r | d | nd | vd |
|---|---|---|---|
| | $d_0=3.4025$ | $n_1=1.0$ | |
| $r_1=-5.06$ | $d_1=4.0$ | $n_2=1.78797$ | $v_2=47.5$ |
| $r_2=-6.3$ | $d_2=0.2$ | $n_3=1.0$ | |
| $r_3=-25.8$ | $d_3=1.8$ | $n_4=1.51680$ | $v_4=64.2$ |
| $r_4=-9.63$ | $d_4=0.1$ | $n_5=1.0$ | |
| $r_5=-43.2$ | $d_5=0.7$ | $n_6=1.74000$ | $v_6=28.2$ |
| $r_6=18.35$ | $d_6=2.4$ | $n_7=1.48669$ | $v_7=81.7$ |
| $r_7=-11.5$ | $d_7=0.6$ | $n_8=1.0$ | |
| $r_8=15.26$ | $d_8=1.8$ | $n_9=1.62041$ | $v_9=60.3$ |
| $r_9=-24.7$ | $d_9=8.0$ | $n_{10}=1.0$ | |
| $r_{10}=-10.5$ | $d_{10}=0.6$ | $n_{11}=1.74077$ | $v_{11}=27.7$ |
| $r_{11}=11.5$ | $d_{11}=5.0$ | $n_{12}=1.0$ | |
| $r_{12}=28.35$ | $d_{12}=3.2$ | $n_{13}=1.73350$ | $v_{13}=51.0$ |
| $r_{13}=-15.1$ | $d_{13}=0.5$ | $n_{14}=1.0$ | |
| $r_{14}=12.08$ | $d_{14}=4.9$ | $n_{15}=1.63930$ | $v_{15}=45.0$ |
| $r_{15}=7.35$ | $d_{15}=146.1001$ | $n_{16}=1.0$ | | wherein $r$, $d$, $nd$, and $vd$ designate respectively the radius of curvature of a lens, the central thickness of a lens or air space between lenses, the refractive index of the glass for line *d*, and Abbe's number.

References Cited

UNITED STATES PATENTS 3,138,651 6/1964 Ruben .............. 350—214

3,380,793 4/1968 Klein .............. 350—215

JOHN K. CORBIN, Primary Examiner

U.S. Cl. X.R.

350—214